April 14, 1925.  1,533,647
C. I. HALL
ELECTRIC DRIVE FOR PHONOGRAPHS
Filed May 18, 1923   2 Sheets-Sheet 1

Inventor:
Chester I. Hall,
by *Alexander S. Lunt*
His Attorney

April 14, 1925. 1,533,647
C. I. HALL
ELECTRIC DRIVE FOR PHONOGRAPHS
Filed May 18, 1923 2 Sheets-Sheet 2
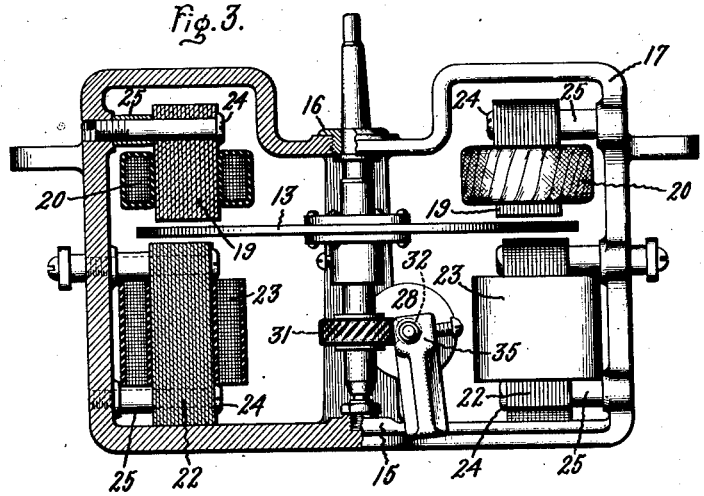
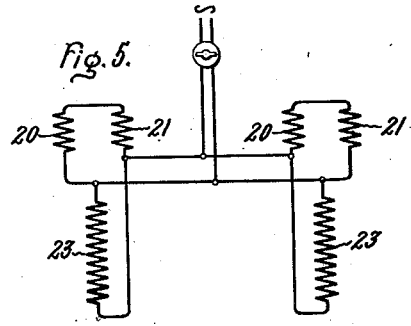
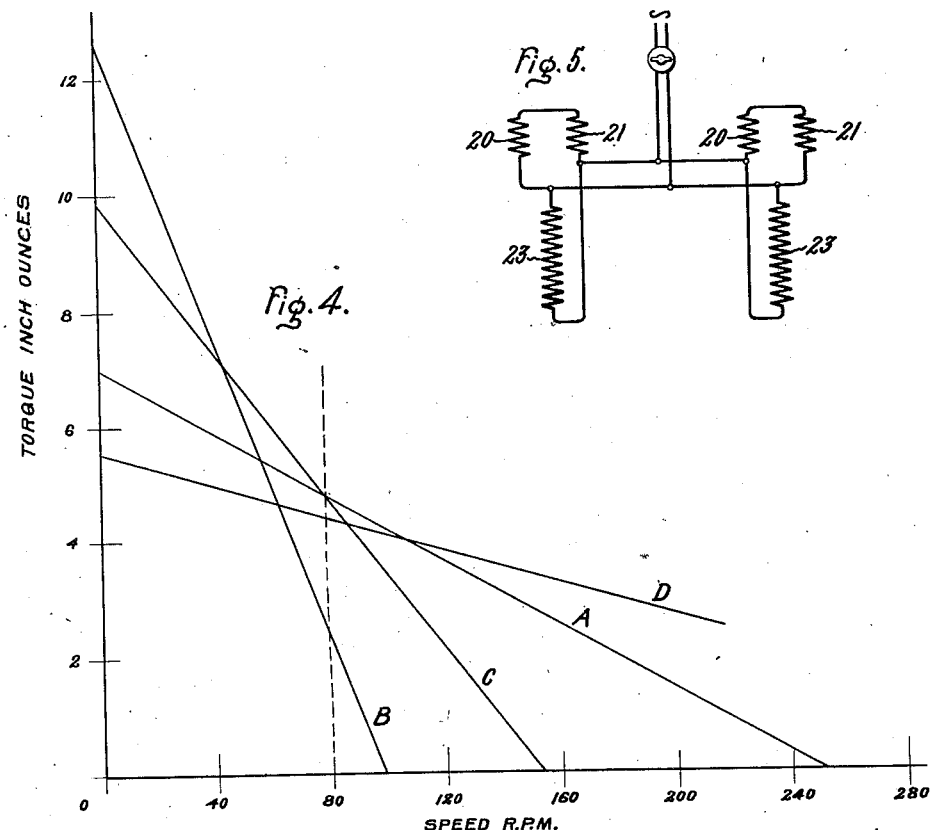
Inventor:
Chester I. Hall,
by *[signature]*
His Attorney Patented Apr. 14, 1925.

1,533,647

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRIC DRIVE FOR PHONOGRAPHS.

Application filed May 18, 1923. Serial No. 639,895.

*To all whom it may concern:*

Be it known that I, CHESTER I. HALL, a citizen of the United States, residing at Fort Wayne, county of Allen, State of Indiana, have invented certain new and useful Improvements in Electric Drives for Phonographs, of which the following is a specification.

My invention relates to electric drives and in particular to an electric drive for phonographs.

It has heretofore been proposed to provide a phonograph drive consisting of an induction disc type electric motor. Such a drive as heretofore devised is open to the objection that it produces vibration which not only interferes with the accurate reproduction of the phonograph record, but produces, in addition, a humming noise, due to the vibration.

I have discovered that the vibration is due to that component of the motor force which is at right angles to the motor driving disc and which reverses in direction with every reversal of the alternating current flux threading the disc. The disc is thereby acted upon by forces which sets it into vibration and more or less of this vibration is conveyed to the phonograph record with detrimental results.

One object of my invention is to eliminate this vibration in an induction type electric drive. A further object of my invention is to provide a phonograph drive of the induction disc type which will function successfully on widely different frequencies, such for example as 25 and 60 cycles, and which will also operate with ample torque and constant speed at either frequency on widely varying voltages. Other advantages of my invention will appear as the description proceeds.

In carrying my invention into effect, I provide a plurality of stationary field elements of the usual type which are so electrically connected and grouped about the rotary disc that the vibratory forces produced thereby counteract each other, whereby no resultant effective vibratory force exists to produce vibration. The combined motor element is furthermore proportioned so as to produce ample torque and speed for directly driving any standard phonograph disc when the motor is energized from an alternating current source of any commercial frequency and voltage. By making the torque at the operating speed substantially independent of frequency changes, a standard speed governor enables the motor to be utilized on any commercial frequency without adjustment.

Figure 1:
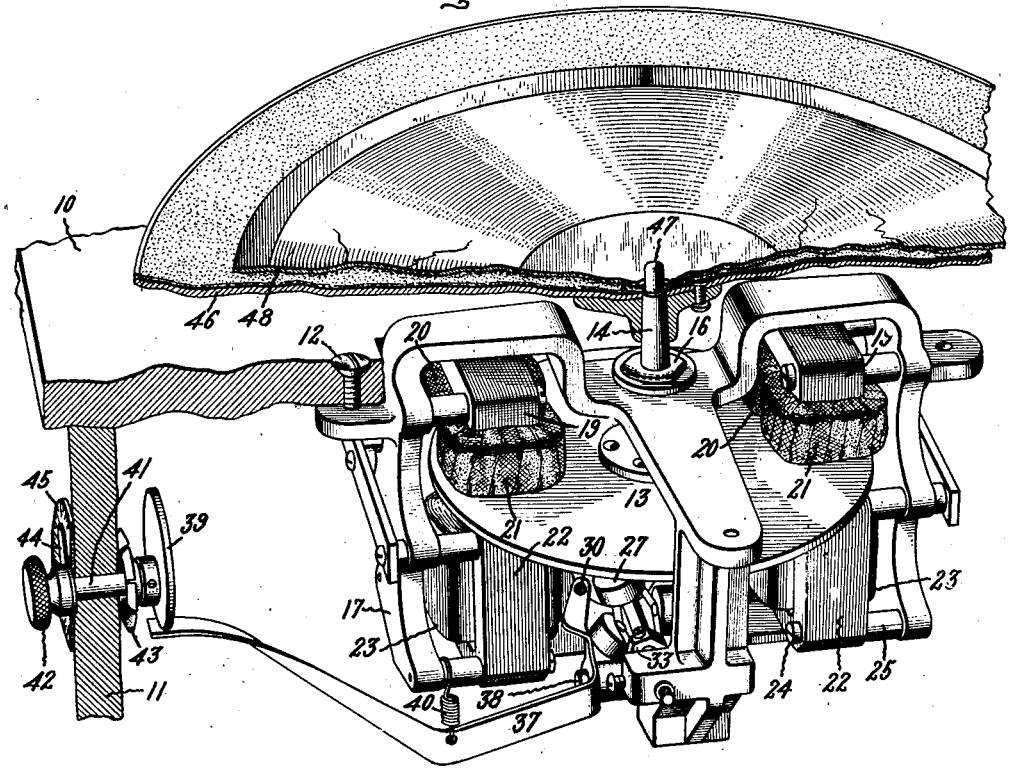
Figure 2:
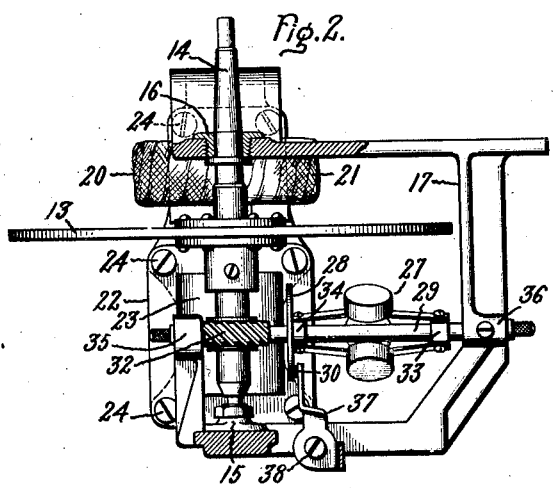

The features of my invention which I believe to be novel and patentable will be pointed out in the claims appended hereto. For a better understanding of my invention reference is made to the accompanying drawing of which Fig. 1 is a perspective view of the drive applied to a phonograph of the disc type, certain parts being broken away to better display the motor; Fig. 2 shows a section of the drive as viewed from the left of Fig. 1 with the left-hand motor field member removed; Fig. 3 shows the drive partially in sections as viewed from the rear of Fig. 1; Fig. 4 represents torque speed curves to be referred to hereinafter, and Fig. 5 diagrammatically illustrates an appropriate circuit connection for the motor.

Referring now to Figs. 1, 2 and 3, 10 represents the top of a phonograph cabinet and 11 a side thereof. Suitably supported in a central opening in the top of the cabinet, as for instance by bolts 12, is the driving element for the phonograph. The drive comprises a disc of conducting material 13 suitably supported upon a central shaft 14. The shaft 14 is supported by a step bearing 15 and an upper guide bearing 16 in a framework 17. On opposite ends of a diameter of the disc 13 are provided similar stationary induction motor field elements. The field elements are of the usual type and comprise a U-shaped upper magnet 19 provided with energizing coils 20 and 21 and a lower E-shaped magnet 22 provided with an energizing coil 23 on its central leg. These field members are held in place on the framework by suitable bolts 24 and spacing bushings 25 in a manner to allow the disc 13 to rotate between the air gaps thus formed between the upper and lower magnetic members. The frame 17 is preferably made in one piece of magnetic material, such as cast iron, in order to provide a return path for the magnetic flux.

The action of the induction disc motor is well known so that it will not be necessary to explain it in detail here. The upper member is of low induction and the lower member of high induction so that the fluxes produced thereby are displaced in phase. The phase displacement can be produced by suitably proportioning the resistances of the coils and the leakage reactance of the field magnets as is well understood in the art. The shifting magnetic fields thus produced cut the disc, set up local currents therein which react against the fluxes to produce a rotative torque. The two motor elements are of course arranged to produce rotation of the disc in the same direction. In all motors of this type there is a component of the force thus produced which is at right angles to the disc. This component may be illustrated by the well known physicist's experiment of placing a ring of conducting material on a deenergized magnetic pole and then quickly energizing the same. The ring will fly off at right angles to the pole due to the currents induced in the ring reacting against the flux. In the induction disc motor, which is excited by alternating currents, this right angular component of the force is first in one direction and then the other due to the reversal of the flux. If the disc is provided with only one motor field element or an unbalanced arrangement of a plurality of field elements, this right angular component tends to tip the disc and with it the shaft first in one direction and then the other and produces a vibration which in the phonograph motor is very detrimental. This vibration is augmented if the disc is of a large radius since then the right angular component of the force has a greater leverage and may even produce a local vibration in the disc itself if the latter is not made of sufficient thickness to resist these bending forces.

I have discovered that the effect of these detrimental vibratory forces may be largely eliminated if the disc is provided with a plurality of magnetic motor members so disposed and electrically connected that the tipping force produced by one member or set of members is counteracted by an opposite and equal force by another member or set of members, and that if in connection with the above arrangement the disc is made of comparatively small radius and of sufficient thickness to resist bending due to these forces, the vibratory effect of these forces is entirely eliminated. One such arrangement is shown in the drawing where the two motor field elements are mounted on directly opposite sides of the disc. These motor fields are preferably made equal and are so connected that the simultaneous fluxes pass through the disc in the same direction, that is to say, the flux through one side of the disc is always equal to and in the same direction as the flux through the other side of the disc. Consequently the forces which are at right angles to the disc instead of producing a seesaw tipping action are balanced with respect to the axis of rotation and therefore are in direction to lift the disc directly up at one instant and press it directly down the next instant. These up and down forces are of course insufficient to bodily lift the disc together with the shaft and the parts carried thereby so that there is no tendency for the shaft to vibrate. Furthermore, the disc is made of a comparatively small radius (about 4½ inches in diameter) and of sufficient thickness (about ⅛ of an inch) to prevent any bending due to these forces. I have found that such an arrangement eliminates all shaft vibrations and humming sounds which are inherent in the induction disc motor drive as heretofore built. The field coils may be connected in parallel or partially in series and partially in parallel so long as the simultaneous flux directions are maintained the same. An appropriate field connection is diagrammatically illustrated in Fig. 5.

It will of course be evident that if the right angular component produced by one field member should happen to be greater than that produced by the other the two field members may be positioned at different distances from the shaft, so that the resultant force will always coincide with the axis of rotation, or in other words so that the tipping couple produced by the product of one component and its lever arm will be equal and opposite to the tipping couple produced by the product of the other component and its lever arm. Similarly if more than two field elements are used they will be so disposed with respect to the shaft that the resultant right angular component coincides with the axis of rotation.

I have discovered that by making the disc of small diameter and providing a plurality of motor field elements, a motor drive is obtained which is capable of successfully operating a phonograph on all commercial frequencies for example on 25 and 60 cycles. The usual single element drive in which the disc is made about equal to the phonograph record disc produces sufficient torque to drive the disc when the motor is excited with 110 volt, 60 cycle energy, but does not give sufficient torque for successful operation on 110 volt, 25 cycle energy. In Fig. 4 I have shown in curve A the speed torque curve of the standard single field element Pathe induction disc phonograph motor when operated at 110 volts and 60 cycles. In curve B I have shown the speed torque curve for the same motor at 110 volts and 25 cycles. In curves C and D I have shown the speed torque curves of my improved double field phonograph motor when operated at 110 volts and 25 cycles and 110 volts and 60 cycles respectively. The normal speed for a phonograph disc is 80 R. P. M. and from the curves of Fig. 4 it will be noted that while the standard motor gives a very high starting torque at 25 cycles (curve B), yet the torque at 80 R. P. M. is only about one-half of what the same motor gives at 60 cycles (curve A). This is due to the fact that the free speed at 25 cycles is too low. In my improved motor the radius of the motor disc is decreased and the free speed increased thereby making the speed torque curve at 25 cycles more desirable in shape as shown in curve C. From this curve it will be noted that at normal speed and voltage at 25 cycles my improved motor gives approximately ½ the starting torque and operates at about ½ the free speed. Further that it gives the same torque at 80 R. P. M. and 25 cycles as the standard motor gives at 80 R. P. M. and substantially the same torque at 60 cycles. The slight difference in torque at the operating speed of my improved motor for widely different frequencies can easily be taken care of by a standard speed governing mechanism without adjustment. Also the liberal amount of torque available at both 25 and 60 cycles in my improved motor assures that the phonograph speed will be maintained constant by the provision of a suitable governing device irrespective of wide fluctuations in voltage. By increasing or decreasing the number or strength of the field magnets the motor torque available at the operating speed may be changed without changing the relation of the torques at different frequencies.

The speed governing mechanism may comprise a centrifugal governor 27, a friction disc 28 driven with the governor spindle 29 and adapted to slide back and forth on the spindle in response to changes in speed, and a relatively stationary friction pad 30 against which the disc 28 is moved when the speed increases above a predetermined value. The spindle 29 is driven from the vertical phonograph shaft 14 by means of a worm pinion 31 secured to shaft 14 and a work gear 32 secured to the governor spindle 29. The collar 33 which carries the fixed end of the governor springs is fastened to spindle 29 while collar 34 which carries the free end of the governor springs and the friction disc 28 is free to slide on the spindle. The governor spindle is suitably supported in bearings 35 and 36 in the framework 17 as illustrated. Such a speed governor is substantially noiseless in operation.

In order that the speed may be readily regulated, the friction pad 30 is mounted on a lever 37 which is pivoted at 38. The outer end of the lever is bent to cooperate with a cam wheel 39 and is held against this cam by means of a spring 40. Cam 39 is fixed to a shaft 41 which terminates on the exterior of the cabinet in a thumb piece 42 by means of which the cam 39, lever 37 and friction pad 30 may be readily adjusted to regulate the speed. The shaft 41 is frictionally held in any adjusted position to which it may be set by means of a spring disc 43. The shaft may carry a pointer 44 which cooperates with a speed dial 45. This speed adjusting mechanism is simple in construction and operation, involves no lost motion, is easily and accurately adjustable and remains fixed in the adjusted position.

The usual record table 46 is suitably supported near the upper end of the shaft 14 and the upper end of this shaft is provided with a reduced portion 47 adapted to fit the central opening in the standard record disc 48.

The cost of a phonograph drive built in accordance with my invention compares very favorably with the cost of previous types of phonograph drives. Due to the small diameter of the motor disc, there is material saving in the amount of copper used therein and the disc may be constructed with much less waste copper than is possible where the disc is made of large diameter. The fact that my improved motor operates successfully on all commercial frequencies eliminates the necessity of the manufacturer providing differently designed motors for different frequencies. The frame being cast in one piece provides a compact, rugged construction which is removable as a unit with the parts carried thereby. The few moving mechanical parts, together with the elimination of electrical noises, assures that the drive will be substantially noiseless in operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other arrangements and for other purposes.

What I claim as new and desire to secure by Letters Patent of the United States, is,—

1. In a phonograph, an electric motor drive of the induction disc type, a rotatably mounted disc of conducting material and a plurality of similar field magnet members symmetrically distributed both radially and circumferentially about said disc for driving the same by induction motor action, the energizing coils of said field members being arranged to be excited by alternating current in such relation that the component of the motor forces acting on the disc at right angles thereto at any instant are in the same direction, whereby the tendency of such forces to vibrate the disc is minimized.

2. In a phonograph, an electric motor drive of the induction type, a rotatably mounted disc of conducting material and a plurality of field magnet members cooperating with said disc in a manner to drive the same by induction motor action, said field members being so proportioned and arranged with respect to the disc and electrically energized from an alternating current source that the resultant of the components of the motor forces which are at right angles to the disc at any instant fall substantially in the axis of rotation of the disc, whereby the tendency of such forces to vibrate the disc is minimized.

3. In a phonograph, an electric motor drive of the induction disc type, a plurality of field magnet members, a disc of conducting material rotatably supported by said shaft in a position to be driven by induction motor action by said field members, said disc being proportioned to resist bending by the motor force components which act at right angles to said disc, and the field members being so proportioned and disposed with respect to said disc that said components are substantially balanced with respect to the axis of rotation of said disc, whereby the tendency of such forces to vibrate the disc is minimized.

4. In a phonograph, an electric motor drive of the induction type comprising a rotatably mounted armature member of conducting material and a plurality of similar field magnet members symmetrically distributed about said armature member both radially and circumferentially for driving the same by induction motor action, the energizing coils of said field member being arranged to be excited by an alternating current in such relation that the components of motor forces acting on the armature at right angles thereto at any instant are balanced with respect to the axis of rotation, and the driving radius of said motor being such that the motor torque at about 80 R. P. M. is substantially independent of wide variations in frequency.

5. A phonograph drive comprising a shaft adapted for mounting thereon a record turn-table, a disc of conducting material mounted on said shaft, said disc being approximately 4½ inches in diameter, a pair of similar field magnet members for driving said disc by induction motor action, said members being symmetrically radially mounted adjacent the periphery of said disc on diametrically opposite sides thereof.

6. In a drive for a phonograph, a disc type induction motor having a plurality of field magnet members, a main drive shaft, an armature for the induction motor mounted directly on said shaft, the average driving radius for said armature being less than 2½ inches and the motor having a speed torque characteristic such that, when excited at normal voltage and 25 cycles and when running at approximately 80 R. P. M., it develops approximately one-half its starting torque and runs at approximately one-half its free speed.

7. A drive for disc type phonographs comprising a shaft arranged to support and drive a phonograph record turn-table, a disc of conducting material mounted on said shaft, a plurality of field magnet members arranged to drive said disc by induction motor action, a centrifugal governor operated brake, driven from said shaft, for governing the speed of said shaft, means for adjusting the brake for different speeds, the average driving radius of said motor being sufficiently small as to make the motor speed at about 80 R. P. M. with constant torque substantially independent of wide variations in frequency, whereby the drive may be used for successfully operating a standard disc type phonograph at normal speed when the field magnet members are energized at normal voltage from sources of widely different frequencies without adjustment of said parts.

8. A motor drive comprising a drive shaft arranged to be driven at a predetermined speed, an armature of conducting material on said shaft, a plurality of field magnet members arranged to drive said armature by induction motor action, the average driving torque arm of said motor being such that the torque developed by said motor at said predetermined speed and with normal excitation is substantially independent of wide variations in frequency.

9. A phonograph drive comprising a shaft arranged to be driven at a normal speed of approximately 80 R. P. M., a plurality of alternating current field magnet members arranged to drive said disc by induction motor action, the average driving torque arm of said motor being such that the torque developed by said motor at said normal speed is substantially independent of wide variations in frequency.

10. In a phonograph drive, an induction motor of the disc type comprising a rotatably mounted disc of conducting material, a pair of similar field magnet members arranged to drive said disc by induction motor action and placed at equal distances from the axis of rotation of said disc on diametrically opposite sides thereof, said field magnet members being connected for excitation from an alternating current source in such relation that the right angular components of the fluxes cutting the disc at any instant are in the same direction for the purpose of minimizing vibrations.

In witness whereof, I have hereunto set my hand this 12 day of May, 1923.

CHESTER I. HALL.